US007012614B2

(12) United States Patent
Chalfin et al.

(10) Patent No.: US 7,012,614 B2
(45) Date of Patent: Mar. 14, 2006

(54) TEXTURE ROAMING VIA DIMENSION ELEVATION

(75) Inventors: Alex Chalfin, Mountain View, CA (US); Paolo Farinelli, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 215 days.

(21) Appl. No.: 10/690,638

(22) Filed: Oct. 23, 2003

(65) Prior Publication Data

US 2005/0088450 A1 Apr. 28, 2005

(51) Int. Cl.
G09G 5/00 (2006.01)
(52) U.S. Cl. .................. 345/582; 345/428; 345/587; 345/620
(58) Field of Classification Search ............... 345/428, 345/582, 584, 587, 590, 620, FOR 111, 141, 345/209
See application file for complete search history.

(56) References Cited

U.S. PATENT DOCUMENTS

| | | | |
|---|---|---|---|
| 5,490,240 A | 2/1996 | Foran et al. .................. 395/130 |
| 5,760,783 A * | 6/1998 | Migdal et al. ............... 345/587 |
| 6,115,047 A | 9/2000 | Deering ........................ 345/422 |
| 6,417,860 B1 | 7/2002 | Migdal et al. ............... 345/582 |
| 6,747,649 B1 * | 6/2004 | Sanz-Pastor et al. ........ 345/428 |
| 2005/0088450 A1 * | 4/2005 | Chalfin et al. ............... 345/552 |

OTHER PUBLICATIONS

C. Tanner et al.. "The Clipman: a Virtual Mipmap," Computer Graphics Proceedings Annual □□Conference Series, 1998, pp. 151-158.*

J. Montrym et al, InfiniteReality: A Real-time Graphics Sy-stem, Computer Graphics□□Proceedings, Annual Conference Series, published at SIGGRAPH, Los Angeles. CA 1997,□□pp. 293-302.*
Foley et al., *Computer Graphics Principles and Practice, $2^{nd}$ edition in* C, Addison-Wesley Publishing Co.,: Reading, Massachusetts 1996, pp. xvii-xxiii, 741-744 and 826-828.
C. Tanner et al., "The Clipmap: a Virtual Mipmap," Computer Graphics Proceedings Annual Conference Series, 1998, pp. 151-158.
J. Montrym et al., *InfiniteReality: A Real-Time Graphics Systems*, Computer Graphics Proceedings, Annual Conference Series, published at SIGGRAPH, Los Angeles, CA 1997, pp. 293-302.
Hakura et al., "The Design and Analysis of a Cache Architecture for Texture Mapping," ISCA '97, Denver, CO (1997), pp. 108-120.

* cited by examiner

*Primary Examiner*—Matthew C. Bella
*Assistant Examiner*—G. F. Cunningham
(74) *Attorney, Agent, or Firm*—Sterne, Kessler, Goldstein & Fox P.L.L.C.

(57) ABSTRACT

The present invention provides texture roaming via dimension elevation. A degree elevated texture is used to contain level of detail (LOD) levels (or tiles) of a clip-map across a degree elevated coordinate space. For example, a three-dimensional (3D) texture is used for two-dimensional (2D) clip-mapping, a four-dimensional (4D) texture is used for 3D clip-mapping, and a 2D texture is used for one-dimensional (1D) clip-mapping. Once the levels of a clip-map are placed in an extra dimension coordinate space, the extra dimension texture coordinate value can be computed based on clip-mapping rules.

21 Claims, 7 Drawing Sheets

REPRESENTATION OF A CLIPMAP IN NORMAL 2D LOD BASED FORM AND AS A 3D TEXTURE

A TRADITIONAL CLIPMAP WITH CUBICAL AND PYRAMIDAL PARTS AS PLACED IN A NORMAL LOD HARDWARE IMPLEMENTATION

A 3D TEXTURE WITH EACH SLICE (Z AXIS) REPRESENTING A DISTINCT LEVEL OF DETAIL (LOD) IMPLEMENTATION

CLIPMAP REGION WITHIN A MIPMAP

CLIPMAP STACK AND PYRAMID LEVELS

32Kx32K TEXTURE REPRESENTED AS A 2Kx2K CLIP-MAP 200

CLIP MAP LEVELS

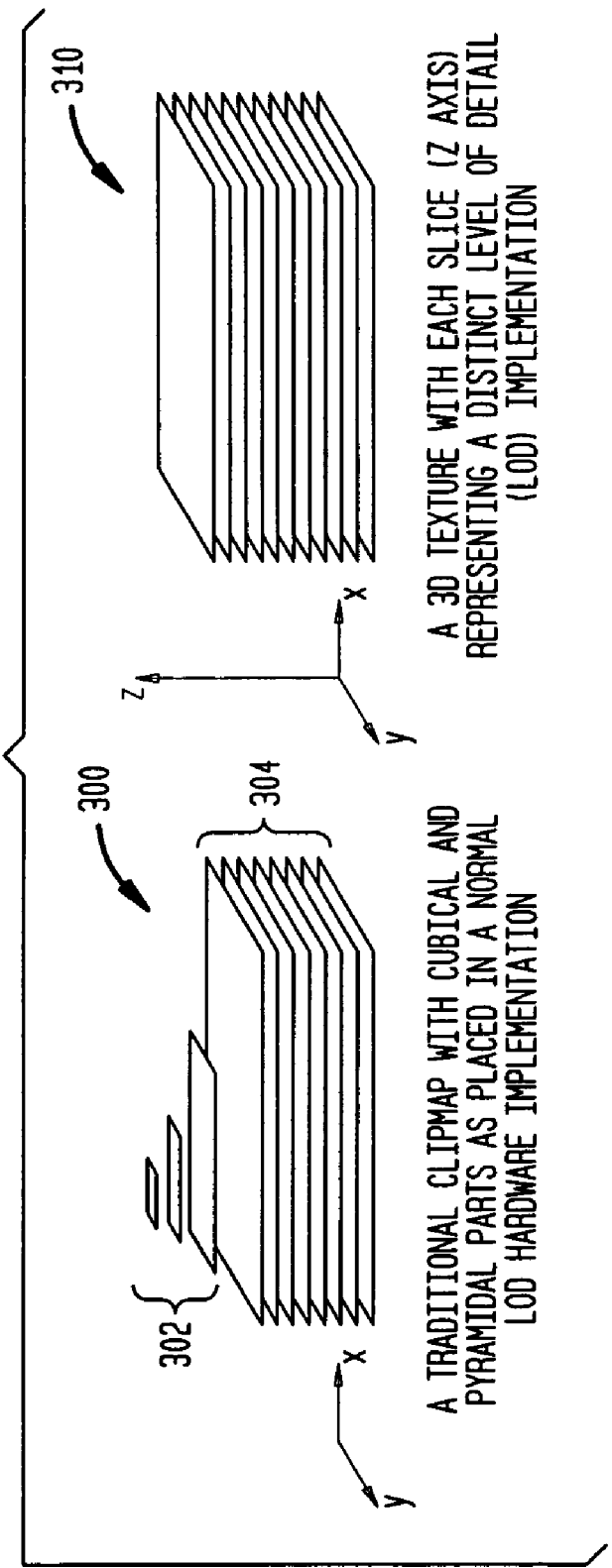

TEXTURE ROAMING VIA DIMENSION ELEVATION

CROSS-REFERENCE TO RELATED APPLICATIONS

Not applicable.

FIELD OF THE INVENTION

The present invention relates to computer graphics.

BACKGROUND OF THE INVENTION

Texture is increasingly applied in a variety of computer graphics images and applications. Texture adds important visual information and surface detail. Texture increases the level of realism and immersion achievable for a given object or environment. Data representing a texture (also called a texture map or texel data) is often stored in texture memory in graphics hardware. During rendering, appropriate texel data is mapped to surfaces being rendered for display. See, e.g., the explanation of conventional texture mapping in Foley et al., Computer Graphics Principles and Practice, $2^{nd}$ edition in C, Addison-Wesley Publishing Co.: Reading, Massachusetts 1996), pp. 741–744 (incorporated by reference herein).

Demand continues to grow for a wide range of larger and more complex textures. Textures such as satellite images, medical data, photographic images and other types of texture are used in many graphical applications. Large textures can easily exceed available texture memory. As a result, large textures may have to be stored in a larger texture database or other storage medium which are cheaper than texture memory but can not be accessed as quickly by a graphics or texture processor.

In many applications, users like to fly over or visualize aspects of texture data in real time. This is known as texture roaming. Texture roaming in real time becomes even more difficult or requires expensive graphics hardware with large texture memory as larger textures are used. For example, flight simulator applications must render frames in real time even when complex or voluminous source data, such as satellite images of the Earth or moon, are used as large texture motifs.

The problem of increasing texture size is further exacerbated in the case of mip-mapping where multiple copies of a texture image at different resolutions must also be stored. A mip-map consists of a texture pattern prefiltered at progressively lower or coarser resolutions and stored in varying levels of detail (LOD) maps. See, for instance, the examples of mip-mapping described in Foley et al., Computer Graphics Principles and Practice, $2^{nd}$ edition in C, at pp. 826–828 and the article by C. Tanner et al., "The Clipmap: a Virtual Mipmap," Computer Graphics Proceedings Annual Conference Series, 1998, pp. 151–158, especially section 3.1 (each of which is incorporated by reference herein). The benefit of mip-mapping is that filtering is only performed once on texel data when the mip-map is initially created and stored in a pyramid of LOD mip-maps. Thereafter, texels having a dimension commensurate with pixel size are obtained by selecting the closest LOD map having an appropriate resolution. By obtaining texels from pre-filtered LOD maps, filtering does not have to be performed during run time. Implementing a large texture mip-map quickly can become an expensive luxury since a large texture memory is needed to store the different pre-filtered LOD maps. Further, many portions of the stored mip-map are not used at a given display image.

Clip-map techniques have been developed to retain the benefits of pre-filtered multiple resolution texture storage while still allowing for fast access to relevant texel data in texture memory. A clip-map is a partial mip-map in which each level has been clipped to a specified size. The standard, full-size mip-map is stored in a host memory such as a database or other less expensive storage area. The clip-map, representing a subset of the complete mip-map and therefore requiring less memory, can be stored in texture memory which can be accessed quicker than the host memory or database. See, U.S. Pat. Nos. 5,760,783 and 6,417,860 issued to C. Migdal et al., and the article by C. Tanner et al., "The Clipmap: a Virtual Mipmap," Computer Graphics Proceedings Annual Conference Series, 1998, pp. 151–158 (each of which is incorporated in its entirety herein by reference).

FIG. 1A is a diagram that shows a clip-map 100 of a larger complete mip-map 110. Clip-map 100 is an updateable representation of a partial mip-map of mip-map 130. As shown in FIG. 1A, finer resolution levels of clip-map 100 are clipped to a specified maximum size compared to complete mip-map 130. Clip-map 100 includes texel data at or near a clip center 105. For convenience, the texel data in each level of clip-map 100 is referred to as a "tile."

The structure of clip map 100 is often thought of as having two parts, a clip-map pyramid 120 and clip-map stack 110 as shown in FIG. 1B. Clip-map pyramid 120 is made up of texel data in coarser resolution levels where an entire source texture map is included within each level. Clip-map stack 110 is made up of texel data in the finer resolution levels that have been clipped to avoid storage of texture of higher resolution texture data far from clip center eyepoint 105. For convenience, the maximum size of each level in clip-map 100 is referred to as the "clip size." Clip-map 100 can be thought of then as a set of tiles made up of texel data corresponding to a source texture image filtered at different resolutions and clipped at a maximum clip size.

FIG. 2A is a diagram that illustrates how a 2K×2K clip-map 200 having clip-map stack 210 and clip-pyramid 220 can represent a 32K×32K source texture. Clip-map 200 has sixteen levels of detail (LOD) maps (also called tiles). Clip-map pyramid 220 has twelve tiles, each tile covering the entire portion of the source image but at progressively finer resolutions. Texel data in the levels in clip-map pyramid 220 ranges from 1×1 texels to 2048×2048 texels. Clip-map stack 210 has four tiles of 2048×2048 texels, but the texel data in each tile within clip-map stack 210 covers progressively clipped portions of the source image at finer resolutions near a viewer position or eyepoint as show in FIG. 2A. FIG. 2B is a further graphical illustration of how different clip-map levels can be arranged relative to a clip-map center. See, further discussion of conventional clip-mapping in the article by J. Montrym et al., InfiniteReality: A Real-Time Graphics System, Computer Graphics Proceedings, Annual Conference Series, published at SIGGRAPH, Los Angeles, Calif. 1997, pp. 293–302 (incorporated in its entirety herein by reference).

For texture roaming applications supported by clip-mapping, texel data is drawn from an appropriate level of detail within a clip-map cached in texture memory. The clip-map is centered about a clip center which can be an arbitrary texture space coordinate that defines the center of each clip-map level. Often the clip center is associated with an eye point in a graphical application. In this way, texture at the finest resolution can be provided near an eye point and coarser texture can be drawn from levels further away from the eye point. During texture roaming, an eye point can move sufficiently to require updating of the clip-map stack so that the texel data in the clip-map (especially the clip-map stack region) remains close to the eyepoint. One technique for updating a two-dimensional clip-map during texture roaming uses toroidal addressing. See, for instance, the example of updating and rendering with clip maps described in C. Tanner et al., "The Clipmap: a Virtual Mipmap," at 151–158 (previously incorporated in its entirety herein by reference above).

Graphics applications have successfully used clip-mapping as described above, however, conventional approaches have required specialized graphics hardware designed to support clip-mapping. This has limited clip-mapping to machines having specialized graphic hardware that support clip-mapping, such as, InfiniteReality graphics hardware available from SGI, a Delaware Corp. See, J. Montrym et al., *InfiniteReality: A Real-Time Graphics System*, at 293–302 (previously incorporated in its entirety herein by reference above). Many graphics applications including texture roaming applications, however, are now being called upon to run on commodity graphics hardware. Such commodity graphics hardware may or may not support clip-mapping.

What is needed is a technique for texture roaming that can leverage clip-map techniques without requiring specialized graphics hardware. In particular, a method and system is needed for supporting texture roaming over large textures on commodity graphics hardware.

BRIEF SUMMARY OF THE INVENTION

The present invention overcomes the above mentioned problems and provides additional features and advantages as described herein.

The present invention provides texture roaming via dimension elevation. A degree elevated texture is used to contain level of detail (LOD) levels (or tiles) of a clip-map across a degree elevated coordinate space. For example, a three-dimensional (3D) texture is used for two-dimensional (2D) clip-mapping, a four-dimensional (4D) texture is used for 3D clip-mapping, and a 2D texture is used for one-dimensional (1D) clip-mapping.

Once the levels of a clip-map are placed in an extra dimension coordinate space, the extra dimension texture coordinate value can be computed based on clip-mapping rules. In one embodiment, a degree elevated texture having three dimensions addressed by texture coordinates (s,t,r) is used to store a 2D clip-map. The 2D clip-map is a clip map in (s,t) texture coordinates of a 2D texture.

The present invention provides methods and systems that apply in arbitrary dimensional texture space. The capabilities to do this only rely on the underlying graphics device to support a texture dimension that is one greater than the texture needed to render. In this way, commodity graphics hardware can be used to support clip-mapping via a dimension elevation according to the present invention.

According to an embodiment, clip levels can be referenced via a single texture unit while maintaining full precision to access each level of detail (LOD) from the extra coordinate dimension. This further eliminates the computation required for deciding the optimum range level of detail used to render a primitive.

Further features and advantages of the present invention, as well as the structure and operation of various embodiments of the present invention, are described in detail below with reference to the accompanying drawings.

BRIEF DESCRIPTION OF THE DRAWINGS/FIGURES

The accompanying figures, which are incorporated herein and form part of the specification, illustrate the present invention and, together with the description, further serve to explain the principles of the invention and to enable a person skilled in the relevant art to make and use the invention.

FIG. 3 is a diagram that illustrates an extra-dimensional clip-map stored in a degree elevated texture according to an embodiment of the present invention.

The present invention is described with reference to the accompanying figures. In the figures, like reference numbers indicate identical or functionally similar elements. Additionally, the leftmost digit or digits of a reference number identify the figure in which the reference number first appears.

DETAILED DESCRIPTION OF THE INVENTION

Figure 1A:
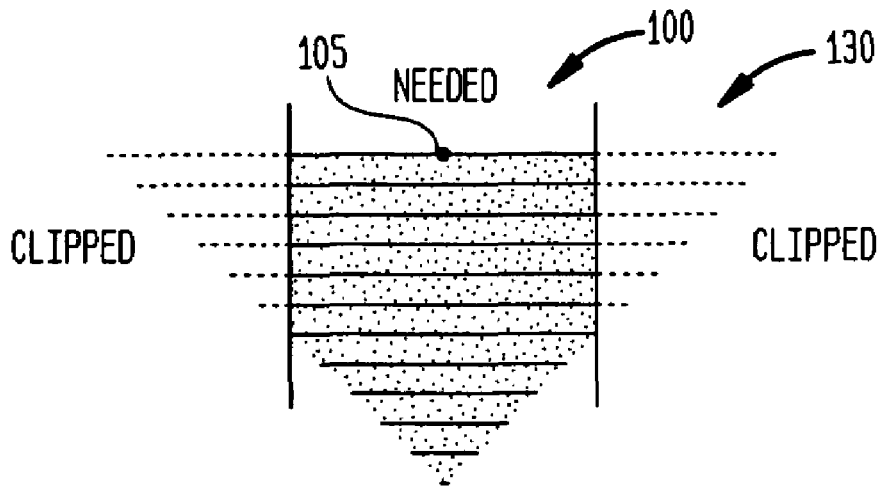
FIGS. 1A and 1B are diagrams that illustrate a structure of a conventional clip-map.

The present invention provides a method, a system, and a computer program product for texture roaming with degree elevated texture. According to embodiments of the present invention, a degree elevated texture is used to contain level of detail (LOD) levels (or tiles) of a clip-map across a degree elevated coordinate space. For example, a three-dimensional (3D) texture can be used to carry out two-dimensional (2D) clip-mapping, a four-dimensional (4D) texture can be used for 3D clip-mapping, and a 2D texture can be used for one-dimensional (1D) clip-mapping. Among other things, the present invention allows clip-mapping to be carried out on any graphics hardware having multi-dimensional texture memory, including but not limited to, commodity graphics hardware. The graphics hardware stores an extra-dimensional clip-map having an extra texture coordinate dimension associated with level of detail information.

Terminology

The following terms are defined so that they may be used to describe embodiments of the present invention. As used herein:

"Pixel" means a data structure, which is used to represent a picture element. Any type of pixel format can be used.

"Real-time" or "Interactive Rate" refers to a rate at which successive display images can be redrawn without undue delay upon a user or application. This can include, but is not limited to, a nominal rate of between 30–60 frames/second. In some example embodiments, such as some flight simulators or some interactive computer games, an interactive rate may be approximately 10 frames/second. In some examples, real-time can be one update per second.

"Texture" means an array of texels. A texel can be a color or an intensity value. A texture can be any array of values that is used to determine a value for a pixel. As used herein, the term "texture" includes, for example, texture maps, bump maps, and gloss maps, but is not limited thereto.

"Texel" means a texture element.

"Texture sample" means a sample selected from a texture map or texture. The sample can represent one texel value or can be formed from two or more texel values blended together. Different weighting factors can be used for each texel blended together to form a texel. The terms "texel" and "texture sample" are sometimes used interchangeably.

"Texture unit" refers to graphics hardware, firmware, and/or software that can be used to obtain a texture sample (e.g., a point sample or a filtered texture sample) from a texture. A texture unit can in some instances obtain multiple texture samples from multiple textures.

"Clip-map" refers to a data structure representing a set of tiles of texture data at multiple levels of detail (LOD). The set of tiles include at least one tile clipped to a clip size.

"Extra-dimensional clip-map" refers to a clip-map having an extra dimensional coordinate.

"Commodity graphics hardware" refers to any graphics hardware that includes or is coupled to texture memory that can store multi-dimensional texture.

Extra-Dimensional Clip-Map in a Degree Elevated Texture

FIG. 3 is a diagram that graphically illustrates how a conventional 2D clip-map 300 is stored as an extra-dimensional clip-map 310 in a degree elevated texture according to an embodiment of the present invention. Clip-map 300 has multiple levels of details in pyramidal and cubical parts 302, 304. Texture in each level is addressed in two-dimensional coordinates (x,y). In practice, often texels in each level are addressed by texture coordinates (s,t) that range from 0 to 1 in a texture space to facilitate addressing in commodity graphics hardware.

According to the present invention, each level of detail is assigned to a corresponding extra-dimension coordinate (e.g, a z-axis coordinate). Texture data in each level is then addressed by three-dimensional coordinates (x,y,z), where the two-dimensional coordinates (x,y) correspond to conventional clip-map level coordinates and the extra-dimension coordinate (z) corresponds to a coordinate value for a particular level of detail. In one embodiment, texels in each level are then addressed by three coordinates (s,t,r), including texture coordinates (s,t) and an extra-dimension coordinate (r), each of which may range from 0 to 1 to facilitate addressing in commodity graphics hardware. The texture coordinates (s,t) can be the same as conventional clip-map level coordinates, or transformed (i.e., scaled and/or translated) from conventional clip-map level coordinates. A scale factor for coordinates (s,t) can be based on the computed extra-dimension coordinate (r).

The pre-processing of an extra-dimension clip-map and texture roaming therewith according to further embodiments of the present invention is described below with respect to FIGS. 4–5. Example computer systems with graphics hardware are described with respect to FIGS. 6–7.

Pre-Processing of Extra-dimension Clip-Map

Figure 4:
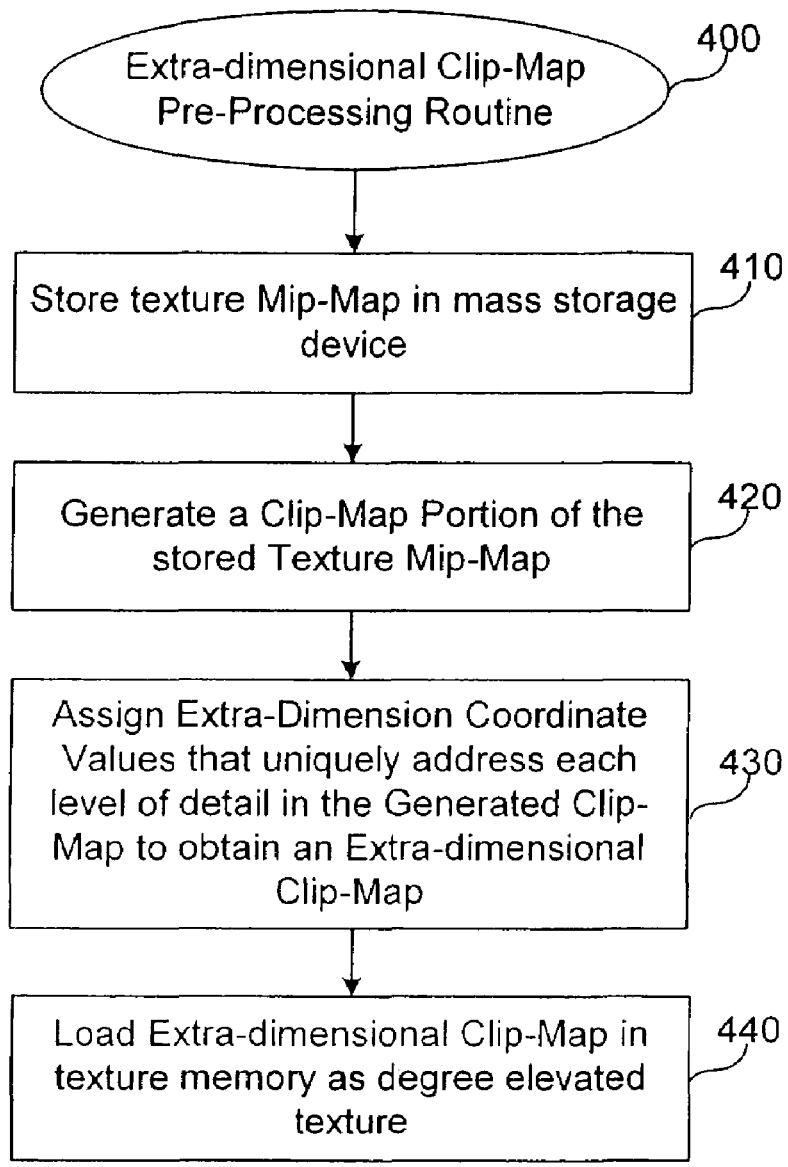
FIG. 4 is a flowchart of an extra-dimension clip-map pre-processing routine according to an embodiment of the present invention.

FIG. 4 is a flowchart of an extra-dimension clip-map pre-processing routine 400 according to an embodiment of the present invention (steps 410–430). In step 410, a texture mip-map is stored in a mass storage device. The texture mip-map can be any type of mip-map that represents a texture image in various levels of detail as is well-known in the art. The mass storage device can be any type of memory coupled to or accessible to a host processor such as, a database, optical disk drive, other available storage unit. In many texture roaming applications, the mass storage device is preferably a relatively cheap storage device for holding large amounts of texture data.

Figure 1B:
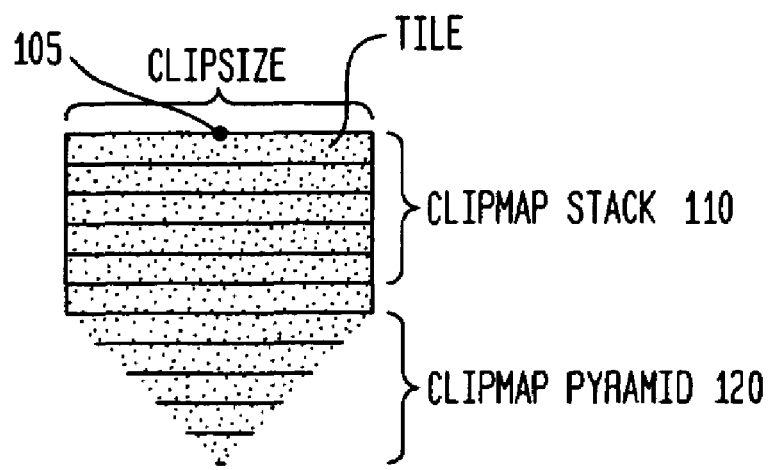
Figure 2A:
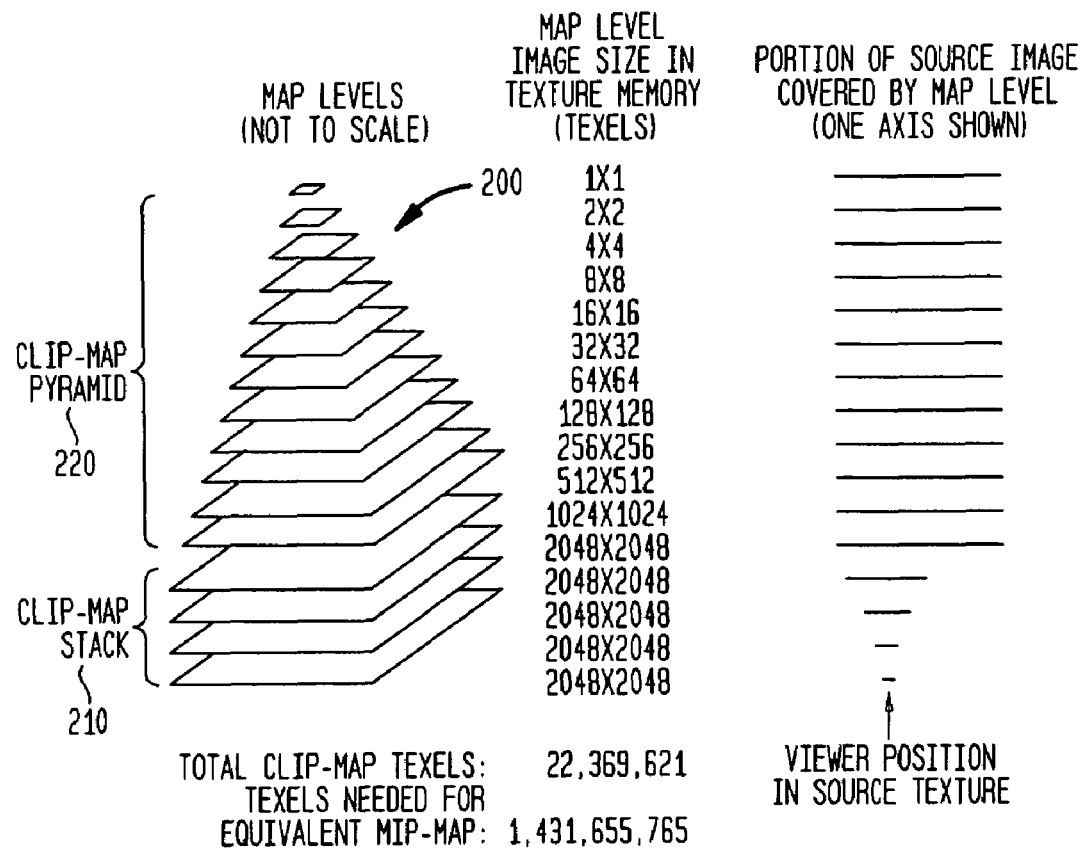
FIG. 2A is a diagram that summarizes an example of a 2K×2K clip-map representing a 32K×32K source texture.
Figure 2B:
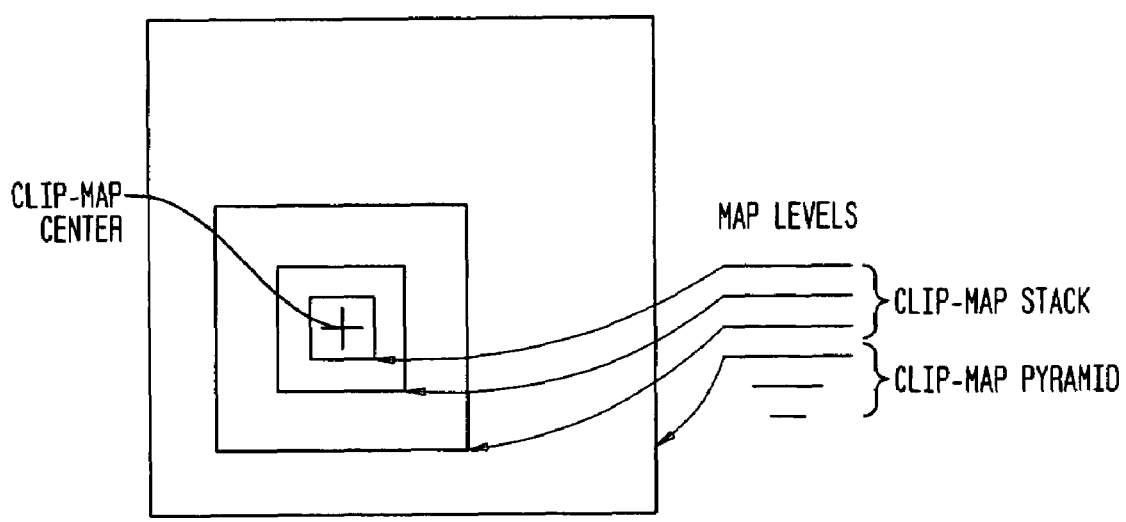
FIG. 2B is a diagram that illustrates different clip-map levels arranged relative to a clip-map center.

In step 420, a clip-map portion of the stored texture mip-map is generated. The clip-map portion can be any conventional clip-map having tiles drawn from the stored texture mip-map based on an eyepoint of a frame or any other desired referenced point and clipped to a desired clipsize as is well-known in the art and described earlier above with respect to FIGS. 1–2. For instance, in the two-dimensional clip-map example of FIG. 3, each of the clip-map tiles (or levels) in cubical part 304 and pyramidal part 302 are generated. Each of the 2D tiles have different levels of detail and can be addressed with two-dimensional coordinates (x,y). In one implementation, step 420 includes generating clip-map coordinate values in texture space coordinates that range from 0 to 1 to facilitate texture addressing by many types of graphics hardware.

In step 430, extra-dimension coordinate values are assigned to the clip-map to obtain an extra-dimensional clip-map (ECM) according to the present invention. The extra-dimension coordinate values uniquely address each level of detail in the clip-map generated in step 420. For example, consider the example of FIG. 3. Each of the clip-map tiles (or levels) in cubical part 304 and pyramidal part 302 can be assigned unique extra-dimension coordinate (z). This assignment of the extra-dimension coordinate can be explicit where a value is assigned during pre-processing, or implicit in a particular ordering or sequence in which the levels are arranged for loading. Note steps 420 and 430 are described with respect to coordinates (x,y,z) which are intended to refer broadly to any three-dimensional coordinate space.

In step 440, the extra-dimensional clip-map generated in step 430 is loaded into texture memory that can store a degree elevated texture. In other words, a texture memory is used which is elevated by one degree compared to the dimension of the source texture image being used in rendering by an application. In the example of FIG. 3, clip-map 300 is a 2D clip-map drawn from a two-dimensional texture source image, however, step 430 generated a 3D ECM 310 which is loaded in step 440 into a three-dimensional texture memory in graphics hardware. Any conventional technique for loading designated texture to a graphics subsystem can be used. For example, appropriate parameters can be passed in a call to a graphics Application Programming Interface, such as, OPENGL, to load the extra-dimensional clip-map generated in step 430 into texture memory.

Texture Roaming with Extra-Dimensional Clip-Map

Figure 5:
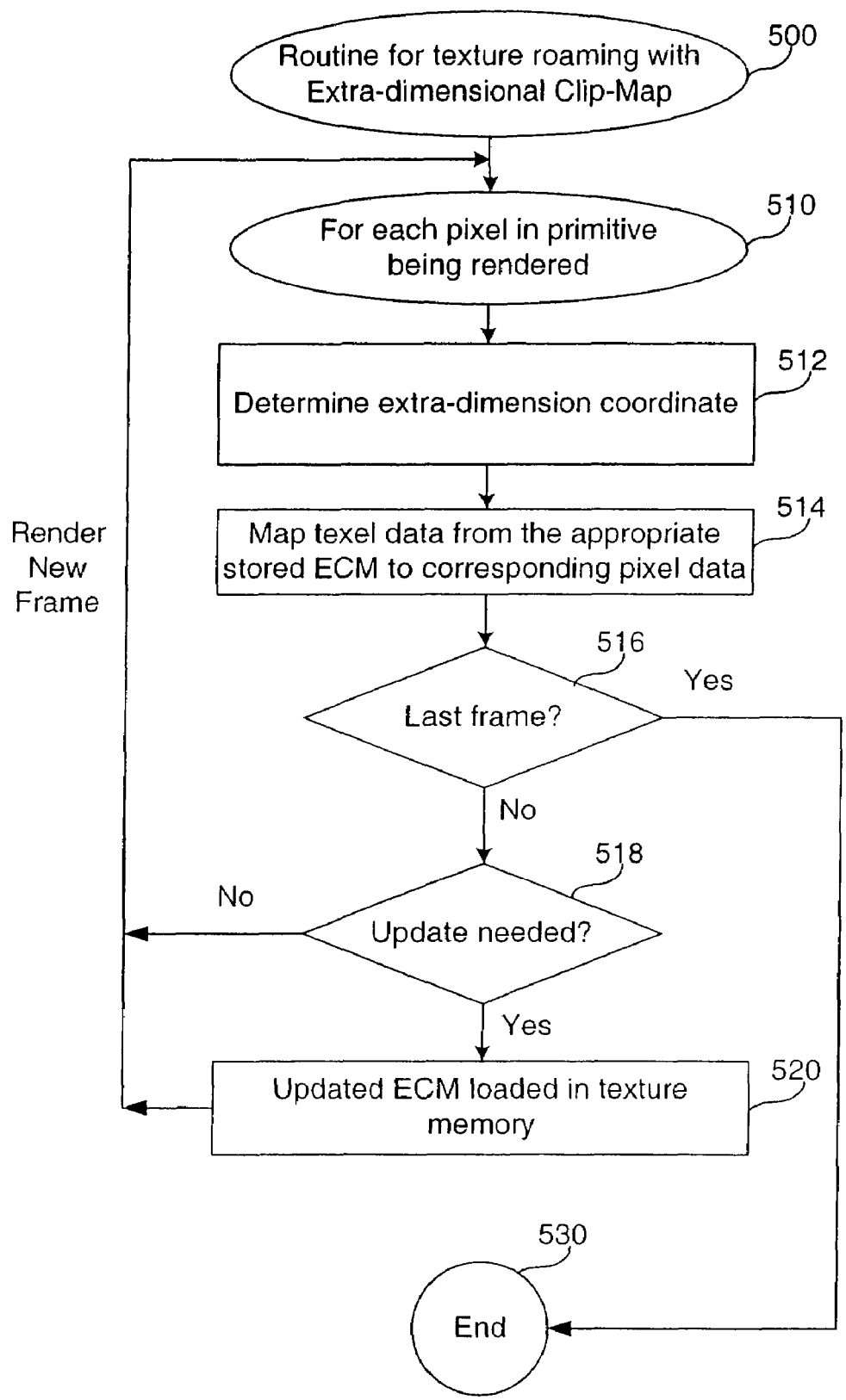
FIG. 5 is a flowchart of a routine for texture roaming with an extra-dimensional clip-map according to an embodiment of the present invention.

FIG. 5 is a routine 500 for texture roaming based on texture data drawn from an extra-dimensional clip-map loaded into a texture memory (steps 510–530). Such texture roaming can be carried out by a texture roaming application such as, a flight simulator, game, or other application. The texture roaming application can be running on a host processor coupled to graphics hardware having texture memory that stores the extra-dimensional clip-map (ECM) as described above with respect to FIG. 4. Preferably, the loaded ECM has a clip center that corresponds to an eyepoint of a frame being rendered.

Steps 510–514 are carried out to apply texture in a scene for an initial frame. Texture is applied to an object being rendered by mapping texel data from the ECM stored in texture memory to corresponding pixel data. For each pixel in the primitive (i.e., triangle) of a frame being rendered (loop 510), steps 512 and 514 are carried out. First, an extra-dimension coordinate is determined based on the highest level of detail texture available in the loaded ECM which offers coverage for the (s,t) location being rasterized (step 512). In one example, a distance from a clip center (e.g., a distance obtained by subtracting an original fragment texture coordinate from clipcenter) along with an invalid border for a clip map tile is used to determine the highest detail level texture available in texture memory which offers coverage of the location being rasterized (ClipLOD). Next, a final LOD value (LOD) is determined from the maximum of (ClipLOD) and a LOD value calculated according to conventional mip-mapping (LOD_mip). Finally, the extra-dimension coordinate can be determined from the final LOD value (LOD)—since this is essentially the inverse of how the extra-dimension coordinate was originally assigned in step 430. Once the texture-dimension coordinate is available, texel data from the loaded ECM can then be mapped to a corresponding pixel (step 514).

In the 3D ECM example discussed earlier, the above final LOD calculation from which the extra-dimension coordinate can be determined in step 512 is carried out using the following equations:

Distance from Clip-Center Computation:

$$sdist = ABS(s - center\_s);$$

$$tdist = ABS(t - center\_t); \text{ and}$$

$$max\_dist = MAX(sdist, tdist);$$

where (s, t) are texture sample coordinates values, (center_s, center_t) are the clip center coordinates values, ABS is an absolute value function, sdist and tdist are distances from clip center for s and t coordinates, MAX is a maximum value function, and max_dist represents the output of the MAX function, that is the maximum of sdist and tdist.

ClipLOD Computation:

$$ClipLOD = \log_2(max\_dist) - \log_2((clipsize/2) - invalid\_border * (clipsize/2));$$

where clipsize is the clip size of the loaded ECM and invalid_border is a border set near an edge of a clip map tile as is known in conventional clip-mapping (see, e.g., C. Tanner article, section 3.2.3, p. 153 previously incorporated by reference above); and ClipLOD is an index for the highest detail level of texture in texture memory which offers coverage for the (s,t) location being rasterized.

Final LOD Computation:

LOD=MAX (LOD_mip, ClipLOD); where LOD_mip is a LOD value calculated according to conventional mip-mapping; and LOD is a final LOD value.

Extra-Dimension Coordinate:

r<---LOD; where r is the extra-dimension coordinate of the clip-map tile in loaded ECM associated with the final LOD value (LOD).

A frame buffer can then be loaded with appropriate (s,t,r) values. In practice, transformations (such as, scaling and/or translation) can be performed. In one embodiment, (s,t) coordinates are transformed to (s',t') coordinates using a scale factor based on the r coordinate value (i.e., s'=function (r,s), and t'=function (r,t)). A frame buffer is then loaded with (s',t', r) values.

Subsequent frames can continue to be rendered using the loaded ECM until the eyepoint or field of view is changed, or the ECM otherwise needs to be updated (steps 516–518). For example, if a last frame has been rendered control proceeds from step 516 to end (step 530), otherwise control proceeds from step 516 to determine is an update is needed (step 518). If an update is not needed, control returns to loop 510 to render a new frame with texture mapped from the current loaded ECM.

Updates During Roaming

In step 520, updates are made to the extra-dimensional clip-map (ECM) loaded in texture memory. For instance, a new eye point over a texture mapped object is determined. For example, a position in a flight path of a jet over a terrain can be a new eyepoint of a scene. Texture data in the ECM is then updated to reflect the new eye point. An ECM can be updated using any conventional clip-map updating techniques except the extra-dimension coordinate values remain the same. For instance, a conventional toroidal addressing scheme can be used (see, e.g., C. Tanner article, section 4, pp. 153–154 previously incorporated by reference above). In the 3D ECM case example, texture in each tile (addressed by two texture coordinates (s,t)) can be updated using toroidal addressing updates, while the extra-dimensional coordinate (r) remains the same value for a particular tile).

This updating technique has advantages in that it does not involve the loading of entire regions of texture memory, but rather a toroidal roaming algorithm is used where only extremely small chunks of texture need to be downloaded per frame. Such toroidal refresh requirements in clip-mapping minimizes the per frame texture download requirements as the eye point roams from frame to frame. The update of the texture is purely optional (and indeed an entire new ECM can be loaded in other embodiments), and is a tradeoff between the time it takes to render a frame and the visual quality of the frame.

Once the loaded ECM is updated, a new frame can be rendered and control proceeds back to loop 510. In this way, a new frame is rendered with texture mapped from the updated ECM. Note that not all levels of an ECM need to be completely updated. An ECM manager can keep track of a highest resolution level which is up-to-date and further limit ClipLOD to be no greater than this value. This also allows partially incomplete clip-maps to be rendered, such as clipmaps with high resolution insets. Updates are carried out from lower resolution levels to higher resolution levels.

Example Architecture of the Invention

Figure 6:
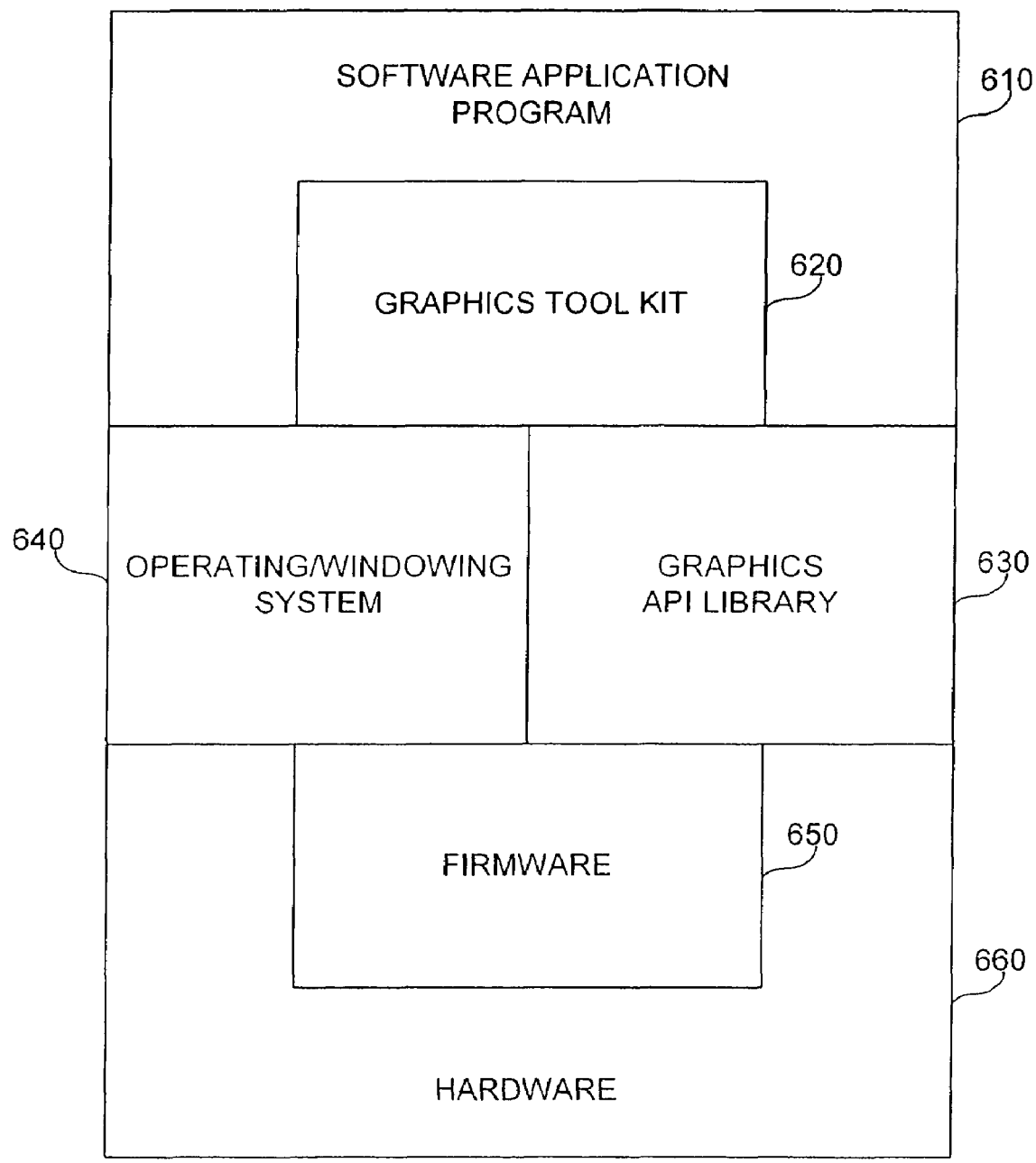
FIG. 6 illustrates a block diagram of an example computer architecture in which the various features of the present invention can be implemented.

FIG. 6 illustrates a block diagram of an example computer architecture 600 in which the various features of the present invention can be implemented. It is an advantage of the invention that it may be implemented in many different ways, in many environments, and on many different computers or computer systems.

Architecture 600 includes six overlapping layers. Layer 610 represents a high level software application program. Layer 620 represents a three-dimensional (3D) graphics software tool kit, such as OPENGL PERFORMER. Layer 630 represents a graphics application programming interface (API), which can include but is not limited to OPENGL, available from Silicon Graphics, Incorporated. Layer 640 represents system support such as operating system and/or windowing system support. Layer 650 represents firmware. Finally, layer 360 represents hardware, including graphics hardware. Hardware 660 can be any hardware or graphics hardware including, but not limited to, a computer graphics processor (single chip or multiple chip), a specially designed computer, an interactive graphics machine, a gaming platform, a low end game system, a game console, a network architecture, et cetera. Some or all of the layers 610–660 of architecture 600 will be available in most commercially available computers.

As will be apparent to a person skilled in the relevant art after reading the description of the invention herein, various features of the invention can be implemented in any one of the layers 610–660 of architecture 600, or in any combination of layers 610–660 of architecture 600. For instance, routines 400 and 500 can be carried out by a software control module in application layer 610 communicating with a graphics API, such as OPENGL in layer 630, that in turn passes instructions and data to commodity graphics hardware in layer 660 having texture memory in which an ECM can be loaded as would be apparent to person skilled in the art given this description. Examples of graphics hardware in layer 660 that can be used include, but are not limited to, graphics cards with multi-dimensional texture memory available from manufacturers Nvidia, ATI, and 3DLabs. In an embodiment, commodity graphics hardware is used that has multi-dimensional texture memory and a degree of programmability in a fragment shading stage, such as, support for the ARB_fragment_program OPENGL extension available from SGI.

Example System Embodiment of the Present Invention

Figure 7:
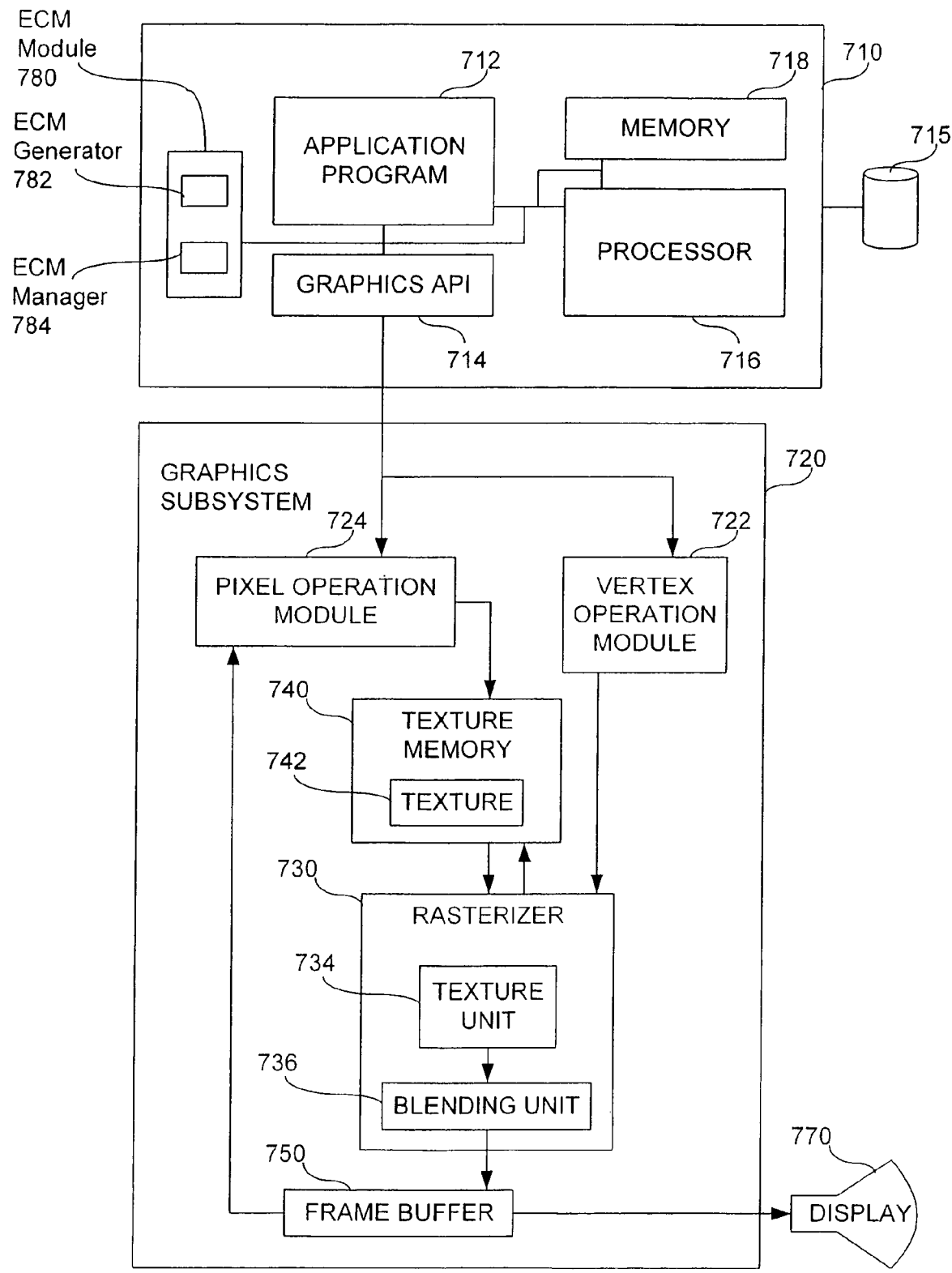
FIG. 7 illustrates an example graphics system according to an embodiment of the present invention.

FIG. 7 illustrates an example graphics system 700 according to an embodiment of the present invention. Graphics system 700 comprises a host system 710, a graphics subsystem 720, and a display 770. Host system 712 includes an ECM module 780 for supporting texture roaming with an extra-dimensional clip-map according to the present invention. In one embodiment, ECM module 780 includes an ECM generator 782 and an ECM manager 784, each of which can be implemented in software, firmware, hardware or a combination thereof. ECM generator 782 can be control logic for generating an ECM as described above with respect to routine 400 in FIG. 4. ECM manager 784 can be control logic for managing an ECM including using graphics subsystem 720 to render frames with texture applied from an ECM loaded in texture memory and to update the ECM as described above with respect to routine 500 in FIG. 5. Each of these features of graphics system 700 is further described below.

Host system 710 comprises an application program 712, a hardware interface or graphics API 714, a processor 716, and a memory 718. Application program 712 can be any program requiring the rendering of a computer image. The computer code of application program 712 is executed by processor 716. Application program 712 assesses the features of graphics subsystem 720 and display 770 through hardware interface or graphics API 714. Memory 718 stores information used by application program 712. Memory 718 can also store an ECM generated by ECM generator 782 until is it loaded into graphics subsystem 720. A database 715 (or other mass storage device) can also be coupled to host system 700 to store a texture mip-map from which ECM generator 782 can load a source texture mip-map and generate an ECM as described above with respect to routine 400.

Graphics subsystem 720 comprises a vertex operation module 722, a pixel operation module 724, a rasterizer 730, a texture memory 740, and a frame buffer 750. Texture memory 740 can store one or more multi-dimensional textures 742. In one example, texture 742 can include an ECM generated by ECM generator 782 and passed to graphics subsystem 720 for loading into texture memory 740. Texture memory 740 is connected to a texture unit 734 by a bus (not shown). Rasterizer 730 comprises a texture unit 734 and a blending unit 736. Texture unit 734 and blending unit 736 can be implemented separately or together as part of a graphics processor. The operation of these features of graphics system 700 would be known to a person skilled in the relevant art given the description herein.

In embodiments of the present invention, texture unit 734 can obtain multiple point samples or multiple filtered texture samples from textures and/or images stored in texture memory 740. Blending unit 736 blends texels and/or pixel values according to weighting values to produce a single texel or pixel. In one embodiment, the ARB_fragment_program OPENGL extension can be used to support blending. The output of texture unit 738 and/or blending unit 736 is stored in frame buffer 750. Display 770 can be used to display images stored in frame buffer 750.

The embodiment of the invention shown in FIG. 7 has a multipass graphics pipeline. It is capable of operating on each pixel of an image (object) during each pass that the image makes through the graphics pipeline. For each pixel of the image, during each pass that the image makes through the graphics pipeline, texture unit 734 can obtain at least one texture sample from the textures and/or images stored in texture memory 740. Although the embodiment of the invention shown in FIG. 7 has a multipass graphics pipeline, the present invention is not so limited and other systems and methods embodiments of the invention can be implemented without a multipass graphics pipeline.

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system, comprising:
   an extra-dimension clip-map generator that generates an extra-dimension clip-map (ECM), wherein said ECM includes multiple levels of detail made up of texel data having coordinates in one or more dimensions corresponding to the dimensions of a source texture image and an extra-dimension coordinate having values associated with the multiple levels of detail; and
   a memory that stores said ECM, whereby texture can be applied when rendering a frame based on texel data sampled from said stored ECM.

2. The system of claim 1, wherein said memory comprises texture memory.

3. The system of claim 2, further comprising graphics hardware, wherein said graphics hardware includes said texture memory.

4. The system of claim 3, wherein said graphics hardware comprises a graphics card.

5. The system of claim 2, further comprising an extra-dimensional clip-map manager that manages loading of said ECM in said texture memory.

6. The system of claim 5, wherein said extra-dimensional clip-map manager further manages loading of updates to texel data in said ECM.

7. A method, comprising:
   storing a texture mip-map in a first memory;
   generating a clip-map of said stored texture mip-map, said clip-map having texel data representing multiple levels of detail of a source texture and a clip center that can be associated with a reference point of a scene to be rendered;
   assigning an extra-dimension coordinate having values associated with the multiple levels of detail of said clip-map to obtain an extra-dimension clip-map.

8. The method of claim 7, further comprising loading the extra-dimension clip-map into texture memory in graphics hardware.

9. The method of claim 8, further comprising rendering a frame including applying texture to pixels based on texel data drawn from the loaded extra-dimension clip-map in texture memory.

10. The method of claim 9, wherein said texture applying step includes:
    determining an extra-dimension coordinate value associated with a corresponding level of detail texture available in the loaded ECM.

11. The method of claim 10, wherein said extra-dimension coordinate value determining step includes:
    determining the highest detail level texture in texture memory (ClipLOD) as function of a distance from a clip center of the ECM to an appropriate texture sample in texel space and an invalid border region for a clip map tile;
    determining a final LOD value (LOD) from the maximum of ClipLOD and a LOD value calculated according to conventional mip-mapping (LOD_mip).

12. The method of claim 7, further comprising loading updates to said texel data in said ECM.

13. A system, comprising:
    first memory means for storing a texture mip-map;
    means for generating a clip-map of said stored texture mip-map, said clip-map having texel data representing multiple levels of detail of a source texture and a clip center that can be associated with a reference point of a scene to be rendered;
    means for assigning an extra-dimension coordinate having values associated with the multiple levels of detail of said clip-map to obtain an extra-dimension clip-map.

14. The system of claim 13, further comprising means for loading the extra-dimension clip-map into texture memory in graphics hardware.

15. The system of claim 14, further comprising means for rendering a frame including means for applying texture to pixels based on texel data drawn from the loaded extra-dimension clip-map in texture memory.

16. The system of claim 15, wherein said texture applying means includes:
    means for determining an extra-dimension coordinate value associated with a corresponding level of detail texture available in the loaded ECM.

17. The system of claim 14, further comprising means for loading updates to said texel data in said ECM.

18. A texture data structure that enables clip-mapping with graphics hardware that includes texture memory, comprising:
    an extra-dimension clip-map (ECM), wherein said ECM includes multiple levels of detail made up of texel data having coordinates in at least one dimension associated with a respective one or more dimensions of a source texture image and an extra-dimension coordinate having values associated with the multiple levels of detail, whereby texture can be applied from said ECM during texture roaming.

19. A system, comprising:
    a host computer that executes an application requiring rendering with texture;
    commodity graphics hardware having texture memory, said commodity graphics hardware being coupled to said host processor; wherein said commodity graphics hardware carries out rendering and applies texture to pixel data based on an extra-dimensional clip-map in said texture memory.

20. An graphics apparatus, comprising:
    texture memory, said texture memory stores a texture data structure that enables clip-mapping with graphics hardware, said texture data structure comprising multiple levels of detail made up of texel data having coordinates in at least one dimension associated with a respective one or more dimensions of a source texture image, and an extra-dimension coordinate having values associated with the multiple levels of detail, whereby texture can be applied from said texture data structure during texture roaming.

21. The graphics apparatus of claim 20, wherein at least one of the multiple levels of detail are clipped to a clip size and are centered about a clip center.

* * * * *